(12) United States Patent
Klaas et al.

(10) Patent No.: US 10,309,472 B2
(45) Date of Patent: Jun. 4, 2019

(54) DISK BRAKE AND DRIVE ELEMENT OF AND ADJUSTING DEVICE OF A DISK BRAKE

(71) Applicant: BPW Bergische Achsen KG, Wiehl (DE)

(72) Inventors: Thomas Klaas, Reichshof (DE); Michael Pehle, Leverkusen (DE); Andreas Dowe, Nümbrecht (DE)

(73) Assignee: BPW BERGISCHE ACHSEN KG, Wiehl (DE)

( * ) Notice: Subject to any disclaimer, the term of this patent is extended or adjusted under 35 U.S.C. 154(b) by 0 days.

(21) Appl. No.: 15/543,056

(22) PCT Filed: Jan. 11, 2016

(86) PCT No.: PCT/DE2016/100007
§ 371 (c)(1),
(2) Date: Jul. 12, 2017

(87) PCT Pub. No.: WO2016/112895
PCT Pub. Date: Jul. 21, 2016

(65) Prior Publication Data
US 2017/0370434 A1 Dec. 28, 2017

(30) Foreign Application Priority Data
Jan. 12, 2015 (DE) .................. 10 2015 100 322

(51) Int. Cl.
*F16D 65/56* (2006.01)
*F16D 65/18* (2006.01)
(Continued)

(52) U.S. Cl.
CPC .......... *F16D 65/567* (2013.01); *F16D 55/22* (2013.01); *F16D 55/2255* (2013.01);
(Continued)

(58) Field of Classification Search
CPC ........ F16D 65/567; F16D 65/18; F16D 55/22; F16D 2121/14; F16D 2125/28; F16D 2125/40; F16D 2125/26
(Continued)

(56) References Cited

U.S. PATENT DOCUMENTS 5,433,298 A * 7/1995 Antony ................. F16D 65/183
188/71.8
5,449,052 A * 9/1995 Macke .................... F16D 65/18
188/71.9
(Continued)

FOREIGN PATENT DOCUMENTS

DE 3131813 C1 3/1983
DE 4307018 A1 9/1994
(Continued)

*Primary Examiner* — Thomas J Williams
*Assistant Examiner* — Mariano Sy (57) ABSTRACT

A disk brake is proposed for a vehicle, preferably a commercial vehicle, having a brake caliper, a brake application device, an adjusting device, a brake lever, and a mechanism which couples the brake lever to the drive element. The brake caliper engages over a brake disk and brake linings on both sides of the brake disk. The brake application device can be actuated by way of a force element, preferably a pneumatic force element. The adjusting device compensates for the brake lining and brake disk wear. The adjusting device is arranged on an adjusting axis which extends in the brake application direction, and is provided with a drive element which can be rotated about the adjusting axis.

15 Claims, 6 Drawing Sheets

(51) Int. Cl.
  *F16D 55/22*      (2006.01)
  *F16D 55/2255*    (2006.01)
  *F16D 121/14*     (2012.01)
  *F16D 125/26*     (2012.01)
  *F16D 125/28*     (2012.01)
  *F16D 125/32*     (2012.01)
  *F16D 125/64*     (2012.01)
  *F16D 125/40*     (2012.01)

(52) U.S. Cl.
  CPC .......... *F16D 65/18* (2013.01); *F16D 2121/14* (2013.01); *F16D 2125/26* (2013.01); *F16D 2125/28* (2013.01); *F16D 2125/32* (2013.01); *F16D 2125/40* (2013.01); *F16D 2125/64* (2013.01)

(58) Field of Classification Search
  USPC .............................. 188/71.8, 71.7, 71.9, 72.7
  See application file for complete search history.

(56) References Cited

U.S. PATENT DOCUMENTS

| | | | | |
|---|---|---|---|---|
| 5,819,884 | A  * | 10/1998 | Giering | F16C 19/502 |
| | | | | 188/71.9 |
| 5,848,673 | A  * | 12/1998 | Strauss | F16D 65/568 |
| | | | | 188/1.11 L |
| 8,590,675 | B2 * | 11/2013 | Jungmann | F16D 65/18 |
| | | | | 188/71.9 |
| 9,453,545 | B2 * | 9/2016 | Jungmann | F16D 65/18 |
| 9,746,043 | B2 * | 8/2017 | Asen | F16D 65/543 |
| 9,958,020 | B2 * | 5/2018 | Siebke | F16D 55/2255 |
| 9,964,166 | B2 * | 5/2018 | Staahl | F16D 55/2255 |

FOREIGN PATENT DOCUMENTS

| | | |
|---|---|---|
| DE | 102008037774 B3 | 2/2010 |
| DE | 102009013005 C5 | 5/2013 |
| EP | 739459 B1 | 6/1998 |

\* cited by examiner

DISK BRAKE AND DRIVE ELEMENT OF AND ADJUSTING DEVICE OF A DISK BRAKE

CROSS REFERENCE TO RELATED APPLICATIONS

The application is a national stage application under 35 U.S.C. 371 of PCT Application No. PCT/DE2016/10007 having an international filing date of Jan. 11, 2016, which claimed the benefit of the German Patent Application No. 10 2015 100 322.8 filed Jan. 12, 2015, the entire disclosure of each of which are hereby incorporated herein by reference.

FIELD

The invention relates to a disk brake for a vehicle and preferably for a commercial vehicle in accordance with the preamble of patent claim 1.

Furthermore, the invention relates to a drive element of an adjusting device for compensating for the brake lining and brake disk wear of a disk brake as claimed in patent claim 13.

BACKGROUND

EP 0 739 459 B1 has disclosed a disk brake which is suitable for use in commercial vehicle brakes and is provided with a brake lever which is arranged pivotably within a brake caliper. There is a mechanical adjusting device, likewise within the brake caliper, for compensating for the brake lining and brake disk wear which occurs during braking operation. In order to derive the adjustment from the pivoting movement of the brake lever, there is a mechanism, furthermore, which couples the brake lever to a drive element of the adjusting device. A pin which is fastened in the end face of the brake application shaft of the brake lever and extends from there to the outside serves as a lever-side mechanism element. A sliding block, into which the free end of the pin engages, serves, inter alia, as an adjustment-side mechanism element. The sliding block is guided longitudinally in a cutout on the outside of the adjusting device. The cutout extends in the longitudinal direction of the adjusting axis of the adjusting device.

The installation space which is taken up by the mechanism is at the expense, however, of the size and, above all, the length of the brake application shaft of the brake lever. This is disadvantageous, insofar as only a large brake application shaft also affords a correspondingly large area for those bearings which are subjected to the full brake application pressure of the brake and via which the brake application shaft of the brake lever is supported rotatably. Lower bearing forces can be achieved by way of a larger brake application shaft, to be precise concerning its diameter and/or its axial length.

A disk brake of the generic type is known from DE 10 2008 037 774 B3. Said disk brake is also provided with an integrated adjusting device for compensating for the brake lining and brake disk wear which occurs during braking operation, the adjustment being derived from the pivoting movement of the brake lever by means of a mechanism. The brake lever is of fork-shaped design and in this way has a clearance which affords space for the adjusting device. As a consequence of said clearance, the brake application shaft is divided into two spatially separated sections. The lever-side mechanism element of the mechanism is a pin which is fastened in an oblique arrangement in the end face of the one section of the brake application shaft.

It is also the case in the disk brake in accordance with DE 10 2008 037 774 B3 that the installation space which is taken up by the mechanism is at the expense of the size and the length of the brake application shaft which can be utilized for the pivotable mounting of the brake lever, which leads to the disadvantages which have already been mentioned above.

SUMMARY

The invention is based on the object of providing as much installation space as possible for the bearings which are arranged on the brake application shaft and transmit the braking forces.

A disk brake for a vehicle having the features of patent claim 1 is proposed for achieving said object.

In said disk brake, the first mechanism element of the mechanism which couples the brake lever to the drive element of the adjusting device is arranged at the inner end of the lever arm in the plane which is defined by the pivoting movement of the lever arm. In this way, the mechanism is situated in a region of the brake application device where no transmission of brake application forces takes place and where transmission of this type would also not be appropriate.

In particular, the lever-side mechanism element is situated at the inner end of the lever arm where the brake lever splits in a fork-shaped manner into a first limb which leads to a first section and a second limb which leads to a second section of the brake application shaft. Therefore, the lever-side mechanism element is situated at the same time at a location which is situated between the adjusting axis and that support for the force element which is arranged at the free end of the lever arm.

Within the context of the installation space which is present overall in the brake caliper, a relatively large amount of installation space is therefore available for the two sections of the brake application shaft, as a result of which the bearings of the brake application shaft can have a large area for transmitting the considerable lever forces, and conversely the specific bearing forces can be kept low.

Furthermore, a drive element of an adjusting device for compensating for the brake lining and brake disk wear of a disk brake is proposed to achieve the stated object, having a carrier, on which a fastening region is configured for mounting the drive element on the adjusting device fixedly so as to rotate with it, and a slotted guide which is arranged on the carrier in the form of a simple or double arm and describes an arc which is curved to the outside in relation to the fastening region of the carrier.

In the case of a drive element of this type, one of the two mechanism elements is a slotted guide which is designed as a single or double arm, which can also be a refinement of the disk brake according to the invention, whereas the other mechanism element is the element which is guided along said slotted guide.

The slotted guide preferably extends at least over part of its overall length obliquely with respect to the adjusting axis of the adjusting device.

If the slotted guide runs parallel to the movement of the engaging element on another slotted guide section, no transmission of movement takes place via said section of the slotted guide. When considering the movement along the slotted guide course, said section therefore leads to that limited play which is required within the context of a mechanical brake adjustment. The transmission of movement starts only after said quasi passive slotted guide section and therefore the limited play are passed through, as soon as the remaining, obliquely arranged slotted guide section is passed through. This function is appropriate if all the components of the adjustment means which follow with regard to the transmission of movement operate without appreciable mutual play, in particular the components which are combined in the adjusting device. In this case, the play which is absolutely necessary for a mechanical brake adjustment is achieved exclusively by way of the two-phase course of the slotted guide.

If the brake adjustment manages largely without play between adjacent faces or edges, the risk is considerably reduced of the adjustment being irritated or influenced negatively in another way, for example, by way of shocks or vibrations of the brake.

In accordance with another embodiment, the slotted guide extends over its entire length obliquely with respect to the plane which is defined by the pivoting movement of the lever arm. In the case of said embodiment, the angle, at which the slotted guide extends obliquely with respect to the plane which is defined by the pivoting movement of the lever arm, can vary over the length of the slotted guide. In particular, said angle can become smaller during the brake application, that is to say with increasing pivoting of the lever. In the case of said embodiment, there is therefore no quasi passive slotted guide section. Rather, the transmission of movement starts immediately and directly. This function is appropriate when the components of the adjustment means which follow with regard to the transmission of movement operate with a certain mutual play, in particular the components which are combined in the adjusting device. In this case, the play which is absolutely necessary for a mechanical brake adjustment is therefore not achieved by way of the course of the slotted guide, but rather by way of the existing system play in the individual components of the adjustment means.

It is proposed with a further refinement that the slotted guide describes an arc which is curved to the outside in relation to the adjusting axis and the curved course of which corresponds at least over a part length to the path which is taken by the inner end of the lever arm during its pivoting movement.

With regard to the configuration of the drive element, it is proposed that it is composed of the slotted guide, which is designed as a single or double arm, and a carrier, to which the slotted guide is fastened, a fastening region for mounting the drive element on the adjusting device fixedly so as to rotate with it being configured on the carrier.

Furthermore, it is proposed with regard to the configuration of the drive element that the slotted guide and the carrier consist of the same material in one piece, preferably of plastic.

DRAWINGS

In the following text, the invention is described in greater detail using exemplary embodiments with reference to the drawings and the details which are illustrated therein. In the drawings.

The drawings do not illustrate an entire disk brake, as installed, in particular, as a commercial vehicle brake which is actuated by compressed air, but rather only the brake application device 5 of the disk brake. With regard to further details of the disk brake including its brake caliper, the brake disk, the brake linings on both sides of the brake disk, reference is made, insofar as the customary design of a disk brake of this type is proposed, to disk brakes as described, for example, in DE 10 2008 037 774 B3 and in DE 43 07 018 A1.

DETAILED DESCRIPTION

The main constituent parts of the brake application device 5, the function of which is to boost, by way of lever action, braking forces which are produced by way of a force element, are a brake lever 10 which is mounted pivotably in a brake caliper of the disk brake, and a pressure piece 8 which operates against at least one of the brake linings of the disk brake, here in the shape of a crossmember which extends over the entire width of the brake lever 10.

The brake lever 10 is composed of a brake application shaft 11 which is divided into two sections, and a lever arm 12. The brake application shaft 11 is supported on its rear side from the inside against the brake caliper of the disk brake. Said support takes place via a pivot bearing, to which end two split bearings are arranged between the brake application shaft 11 and a corresponding face in the brake caliper. In the other direction, that is to say toward the brake lining and the brake disk, the brake application shaft 11 is supported pivotably via two further split bearings 17 against the pressure piece 8 which is of recess-shaped design in this region.

The brake application shaft 11 is configured as an eccentric. This is because the rear-side split bearings which are supported against the brake caliper have a rotational axis A2 which is arranged offset vertically in comparison with the rotational axis A1 of the split bearings 17 which are supported against the pressure piece 8. During a rotation of the brake application shaft 11 about the rotational axis A2 which defines the rotational movement with respect to the brake caliper, a forward movement of the pressure piece 8 therefore occurs in the direction of the brake disk of the disk brake, with the result that the brake is applied.

The lever arm 12, as a single-piece constituent part of the brake lever 10, serves to rotate the brake application shaft 11 by means of a boosting lever action. The center line of said lever arm 12 extends at a right angle with respect to the brake application shaft 11. Close to its outer end 12A, the lever arm 12 is provided with a support 16. The latter is preferably of spherical-like design and defines a supporting point, against which the force element of the disk brake operates. In the case of disk brakes which are actuated by compressed air, said force element is the tappet of a pneumatic brake cylinder.

The brake lever 10 is fork-shaped overall and branches, starting from the lever arm 12 which is arranged on the pivoting center line, into two limbs 13A, 13B, of which the one limb 13A is connected to the first section 11A of the brake application shaft 11, and the second limb 13B is connected to the second section 11B of the brake application shaft 11. In this way, the brake lever 10 has a clearance 40 to the inside in an extension of the lever arm 12. Said clearance 40 is delimited, inter alia, by way of the end faces which face one another of the sections 11A, 11B of the brake application shaft 11, and, toward the lever arm 12, by way of the inner end 12B of the lever arm 12.

The inner end 12B of the lever arm 12 is that location on the lever arm 12, at which the limbs 13A, 13B branch. Said location is situated between the rotational axis A2, about which the brake lever 10 pivots relative to the brake caliper, and the support 16. Said location is preferably situated at approximately one third of the distance between the rotational axis A2, about which the brake lever 10 pivots relative to the brake caliper, and the support 16.

The clearance 40 which is necessitated by the double-limb fork shape of the brake lever 10 affords space for an adjusting device 20. Constituent parts of the adjusting device 20 are, inter alia, a drive element 10, an output element which reduces the air play of the brake, and, in the movement path between the drive element and the output element, a one-way clutch and an overload element.

Said constituent parts of the adjusting device 20 are arranged on a common adjusting axis L. The adjusting axis L extends in the brake application direction and therefore perpendicularly with respect to the plane of the brake disk. The adjusting axis L extends through the clearance 40 of the brake lever 10. It is preferably arranged in such a way that it intersects one of the rotational or pivoting axes A1, A2 of the brake lever 10.

In order to derive the adjustment of the brake from the pivoting of the brake lever 10, there is an adjusting mechanism which couples the brake lever 10 to the drive element 27 of the adjusting device. The adjusting mechanism is composed of a first mechanism element 31 which is situated on the brake lever 10 and a second mechanism element 32 which interacts therewith and is situated on the adjusting device 20. The two elements 31, 32 preferably engage into one another virtually without play, in order thus to prevent irritations of the brake adjustment as a result of shocks or vibrations of the disk brake.

The first (that is to say, the lever-side) mechanism element 31 is arranged in the clearance 40 at the inner end 12B of the lever arm 12 and therefore where the two limbs 13A, 13B branch. In this way, the first mechanism element 31 is situated at a location in that plane E, within which the lever arm 12 carries out its pivoting movement S during the brake application of the brake. The adjusting axis L also lies in said plane E. At the same time, the first mechanism element 31 is situated at a location between the adjusting axis L and the support 16 for the force element, which support 16 is arranged at the other end 12A of the lever arm 12.

In the embodiment according to FIGS. 1 to 6, the first element 31 of the adjusting mechanism is a pin or bolt which is fastened in the brake lever 10 on the pivoting center line of the lever arm 12 and extends with its free end toward the adjusting axis L.

The second (that is to say, the adjustment-side) element 32 of the adjusting mechanism is a slotted guide comprising two arms which run equidistantly and a slot 33 which is arranged in between. In the slot which can also be designed as a groove 33 in accordance with the outline illustrations of FIGS. 4 to 6, the pin 31 is capable of moving along the slotted guide 32, said pin 31 driving the drive element 27 and setting it in rotation about the adjusting axis L.

In order that a rotation of the drive element 27 about the adjusting axis L occurs during the brake application movement S, the slotted guide 32 runs on a slotted guide section 32B and therefore at least over a part of the entire length of the slotted guide obliquely with respect to the adjusting axis L.

In order to derive the transmission of movement from the pivoting movement S of the lever arm 12 with particularly low friction, the slotted guide 32 describes an arc which is curved to the outside in relation to the adjusting axis L. The curvature of said arc follows the likewise curved movement of the pin 31 which is arranged at the inner end 12B of the lever arm 12 during the pivoting of the brake lever 10. In accordance with the outline illustration of FIG. 6, said curvature can be in relation to one of the rotational axes A1, A2 of the brake lever 10 as a curvature center axis.

The drive element 27 (illustrated in FIG. 3) of the adjusting device 20 preferably consists of plastic. It is composed in one piece of the slotted guide 32, which is designed as a double arm with a slot guide, and a carrier 35, on which the double arm is integrally formed. The carrier 35 has a fastening region 36 for mounting the drive element 27 on a drive shaft of the adjusting device 20 fixedly so as to rotate with it. Said fastening region 36 is designed here as a ring. Its inner edge 39 is designed as a polygon which is seated without play in the circumferential direction on a corresponding polygon of the drive shaft of the adjusting device.

Figure 1:
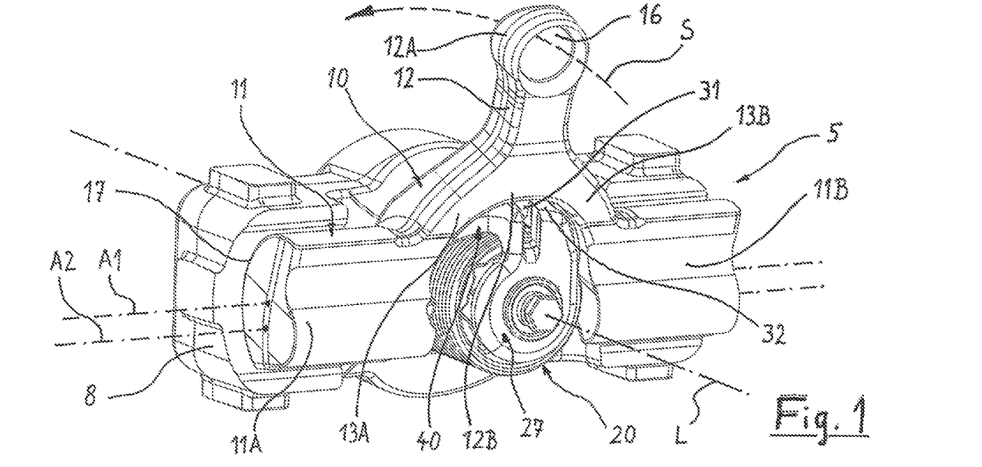
FIG. 1 shows a perspective illustration of a first embodiment of a brake application device which is a constituent part of a vehicle disk brake.
Figure 2:
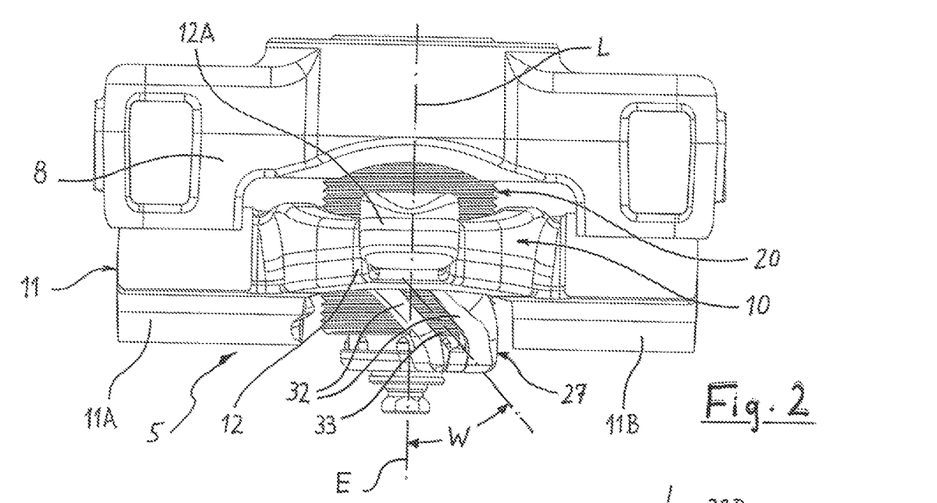
FIG. 2 shows the objects according to FIG. 1, the lever being illustrated in a changed position during a progressing brake application.
Figure 3:
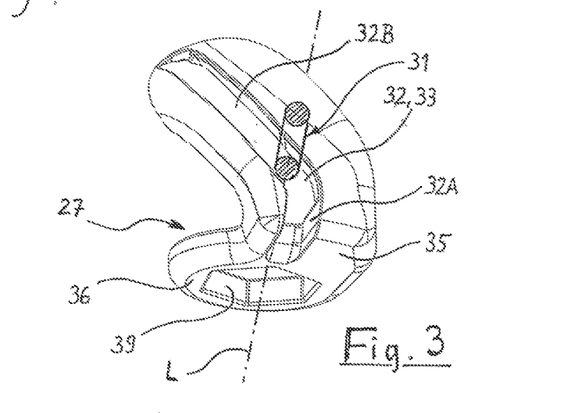
FIG. 3 shows a perspective illustration only of a drive element of an adjusting device for compensating for the brake lining and brake disk wear of the disk brake.
Figure 4:
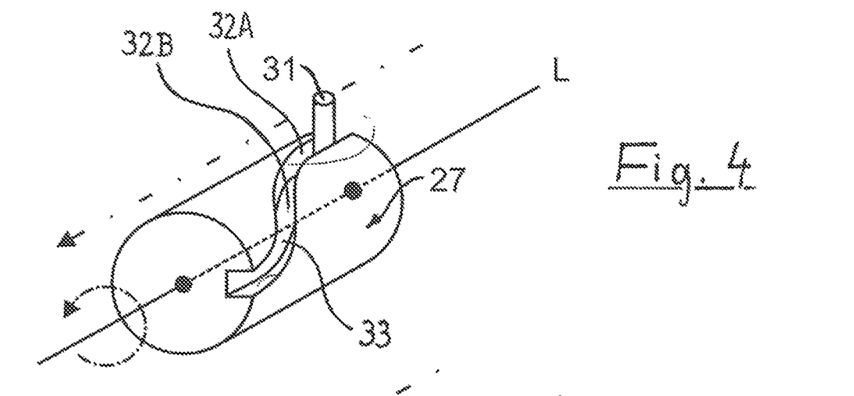
FIG. 4 shows an outline illustration in respect of the mechanism which is used in the brake application device.
Figure 5:
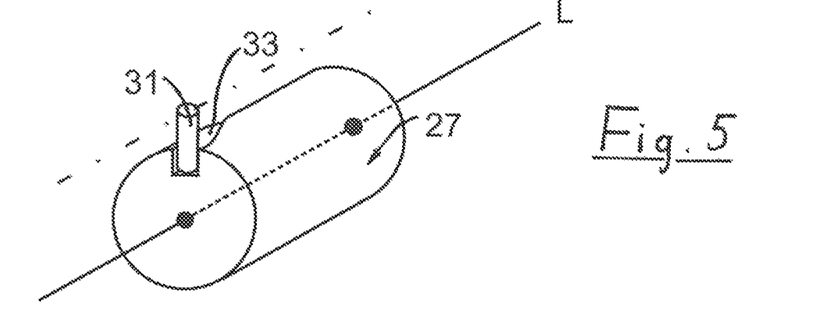
FIG. 5 shows the mechanism according to FIG. 4 in another position.
Figure 6:
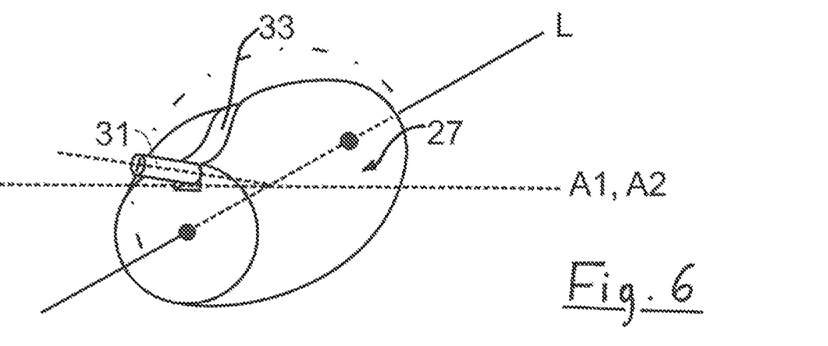
FIG. 6 shows a modified outline illustration in respect of the mechanism which is used in the brake application device.

In accordance with the outline illustrations of FIGS. 4 to 6, the angle, at which the slotted guide 32 which is configured as a groove 33 here runs with respect to the adjusting axis L, can vary over the length of the slotted guide 32. For example, at the beginning of the brake application movement S, the slotted guide section 32A which is then in play-free engagement with the pin 31 can run parallel to the adjusting axis L, with the result that the drive element 27 does not yet experience a rotation. A clear rotation of the drive element 27 about the adjusting axis L takes place only in the further course of the movement of the brake lever, on account of the oblique arrangement of the adjoining slotted guide section 32B. As an alternative, the drive element 27 can also be configured integrally with the first adjusting element of the brake. A desired adjusting characteristic can be fixed by way of a correspondingly oblique course of the slotted guide section 32B. This provides the option to give the brake a defined adjusting characteristic by way of the selection of a defined drive element 27 or, for example, to provide different brake types with a drive element 27 which is adapted in terms of its slotted guide course, in the case of an identical adjusting device and an identical brake lever 10.

In accordance with the outline illustrations of FIGS. 4 to 6, the difference from the known drive systems, in which a rotary drive movement of the brake lever 10 is converted into a rotary output movement of the adjusting device 20 with rotational axes which are assigned at an angle, consists in the utilization of an axial longitudinal movement which is converted into a rotary output movement.

Although the lever-side first mechanism element 31 experiences a pivoting movement about the rotational axis A1 or A2 which extends transversely with respect to the axis L, said rotation does not produce a drive movement on the second mechanism element 32. Only the axial relative movement parallel to the axis L of the first mechanism element 31 brings about the rotary drive of the drive element 27.

This takes place by the first mechanism element 31 coming into contact in the one pivoting direction of the brake lever 10 with the slotted guide face which is ramp-like with respect to the axis L, and always pressing said slotted guide face away laterally. In the opposite pivoting direction, the first mechanism element 31 comes into contact with the slotted guide face which is ramp-like with respect to the axis L, and always presses said slotted guide face away laterally. Here, the slotted guide faces are spaced apart in an unvarying manner over their length, and said spacing is dimensioned in such a way that the pin 31 lies virtually without play between the slotted guide faces or encloses them from the outside.

This play-free insertion makes it possible to keep the mechanism elements 31 and 32 permanently in lateral engagement without appreciable hysteresis and at the same time to fixedly stipulate the idle stroke (without a transmission of movement) and the drive stroke (with a transmission of movement) via different curvature angles of the one mechanism element. The permanent lateral contact of the mechanism elements 31, 32 with respect to one another rules out an undesired influence of the adjustment by way of, for example, vibrations, since the mechanism elements 31 and 32 do not perform any uncontrolled lateral movements with respect to one another, for instance lateral to and fro knocking.

FIGS. 4 to 6 outline the indicated principle and show the pure axial drive which is converted into a rotational movement. Here, the pin 31 is at a right angle on the axis L. The advancing of the pin parallel to the axis L brings about a rotational movement in the rotational body or mechanism element 32 counter to the clockwise direction via the one slotted guide face. Pushing back on the same straight line brings about a rotational movement in the opposite direction via the opposite slotted guide face.

FIG. 5 shows how the pivoting movement of the brake lever 10 has an effect on the axis A1 or A2 at a right angle with respect to the axis L in the mechanism. The slotted guide is adapted to the pivoting course of the one mechanism element merely by the other mechanism element being of arcuate configuration with respect to the axis L, parallel to the pivoting course. The pure rotational component of the pivoting movement does not have an influence on the rotary drive, however. Merely the axial component of the pivoting movement brings about the sliding of the mechanism elements 31, 32 on one another, and therefore the rotary drive.

As long as the pin 31 is arranged perpendicularly with respect to the axis A1, A2, virtually only the axial relative movement enters into the drive movement. If, in contrast, the pin 31 lies at an angle of between 89° and 0° with respect to the axis A1, A2, that component of the axial relative movement which influences the rotary drive decreases as the actuating angle decreases, and that component of the pivoting movement which has an influence increases. If the pin 31 lies parallel to the axis A1, A2 (angle=0°), a rotary drive can no longer take place. In an angular range of from 45° to 135° with respect to the axis A1, A2, the utilization of the axial relative movement for a sufficient rotary drive is possible. The adjusting mechanism operates in an optimum manner in an angular range between 80° and 100°.

By virtue of the fact that the slotted guide runs on the slotted guide section 32A parallel to the movement of the engaging element 31, no transmission of movement takes place via said passive section of the slotted guide. If the movement along the slotted guide course is considered, said section 32A therefore leads to that limited play which is absolutely necessary within the context of the mechanical adjustment of the disk brake. The transmission of movement starts only when the passive slotted guide section 32A and therefore the limited play has been passed through, as soon as the other, obliquely arranged slotted guide section 32B is passed through.

It is important in said embodiment that all the components of the adjustment means which follow in the transmission of movement operate without play with respect to one another, in particular the components which are combined in the adjusting device 20. This is because the play which is absolutely necessary for the brake adjustment is realized structurally exclusively by way of the described two-phase course of the slotted guide 32.

Figure 7:
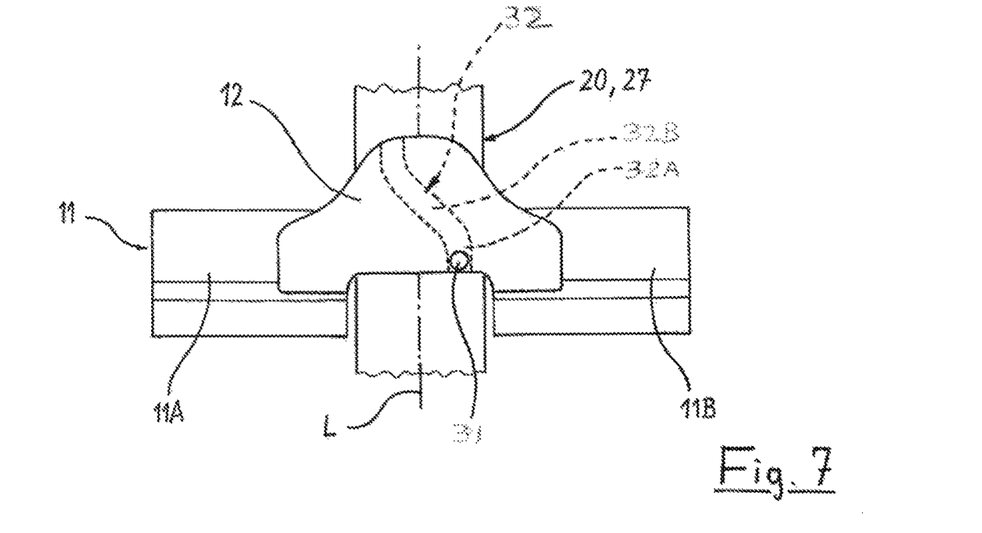
FIG. 7 shows a plan view of a second embodiment of a brake application device which is a constituent part of a vehicle disk brake.
Figure 8:
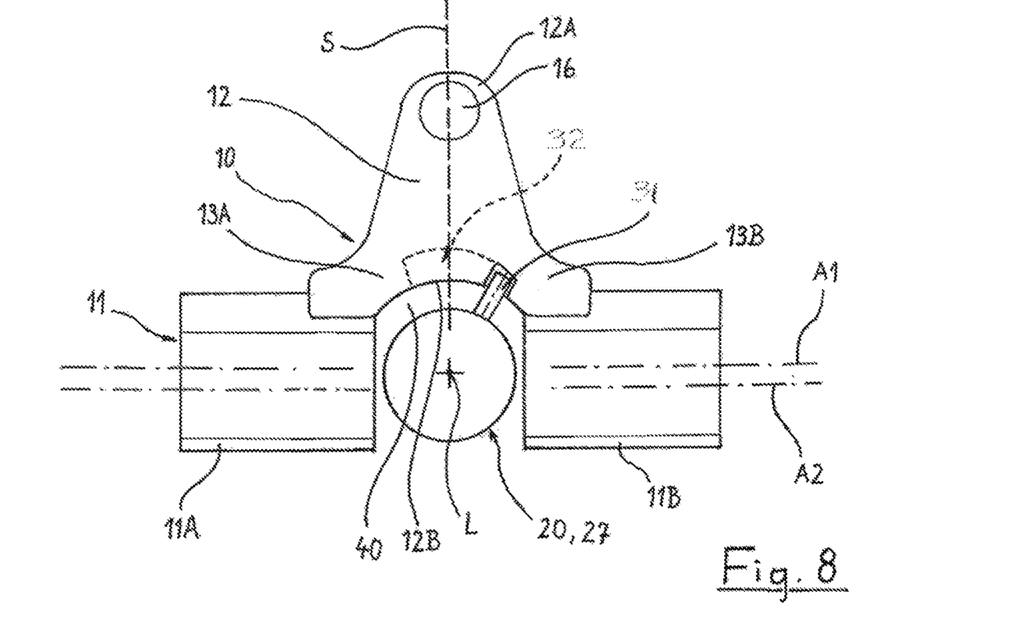
FIG. 8 shows the brake application apparatus according to FIG. 7 in one view.

FIGS. 7 and 8 show a second embodiment. In said embodiment, the first mechanism element 32 which is arranged on the brake lever 10 is a slotted guide in the configuration of a groove, into which a pin which forms the second mechanism element 32 engages with its pin end. Here, the pin forms the drive element of the adjusting device 20.

If the brake lever 10 is a cast component or a forged component, the groove 32 can be cast or forged thereon, with the result that no further component is required. This also otherwise applies to the embodiment with a lever-side pin 31 as a first mechanism element. Said pin 31 or an element in the shape of a pin of this type can also be cast or forged directly on the lever 10.

In FIGS. 7 and 8, the first mechanism element 32 which is designed as a groove is also arranged within the clearance 40 at the inner end 12B of the lever arm 12, where the fork-shaped brake lever splits into its two limbs 13A, 13B. The first mechanism element 32 is once again situated in that plane, within which the lever arm 12 carries out its pivoting movement S during the brake application. At the same time, the first mechanism element 32 is situated at a location between the adjusting axis L and the support 16 for the force element, which support 16 is arranged at the outer end 12A of the lever arm 12.

In order that a rotation of the drive element 27 about the adjusting axis L occurs during the brake application movement, the groove 32 runs over at least a part of its length, namely over a slotted guide section 32B, obliquely with respect to the adjusting axis L.

The angle, at which the groove 32 runs with respect to the adjusting axis L, can vary over the length of the groove. At the beginning of the brake application movement of the lever 10, that section of the groove which is situated in engagement with the pin 31, namely the slotted guide section 32A, has a rather straight course, with the result that the drive element first of all experiences no rotation or only a small rotation. Instead, a rotation of the drive element about the adjusting axis L takes place only in the further course of the movement of the brake lever 10 when the pin 31 runs through the groove or slotted guide section 32B.

Figure 9:
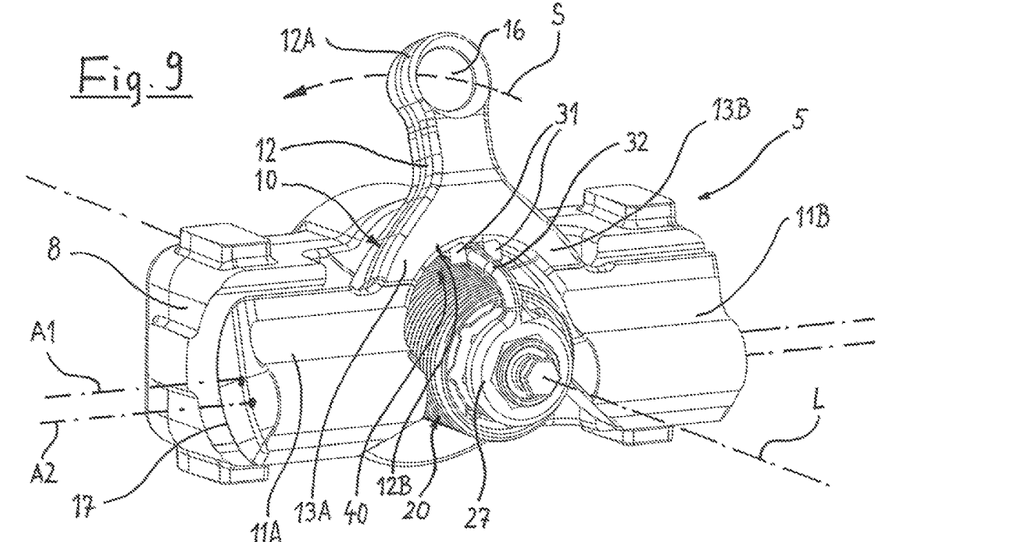
FIG. 9 shows a perspective illustration of a third embodiment of a brake application device which is a constituent part of a vehicle disk brake.
Figures 10, 11:
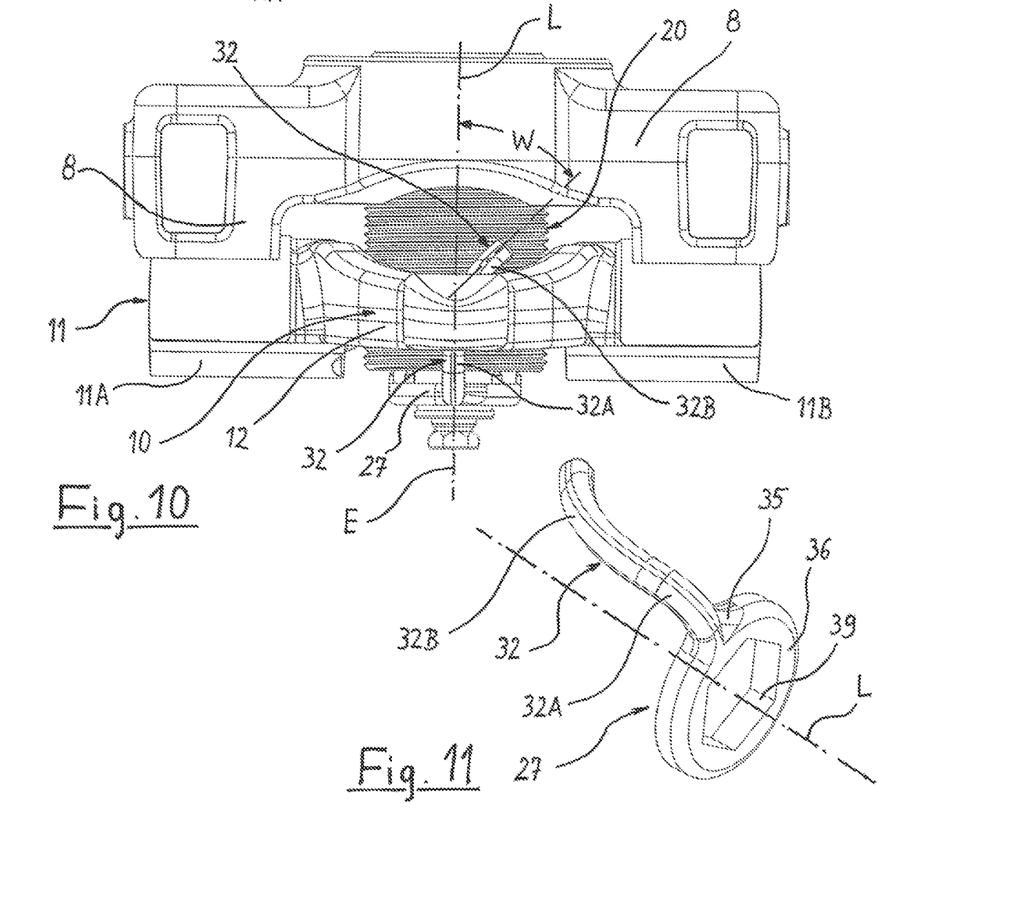
FIG. 10 shows a plan view of the brake application device according to FIG. 9.
FIG. 11 shows a perspective illustration only of the drive element of the adjusting device.
Figure 12:
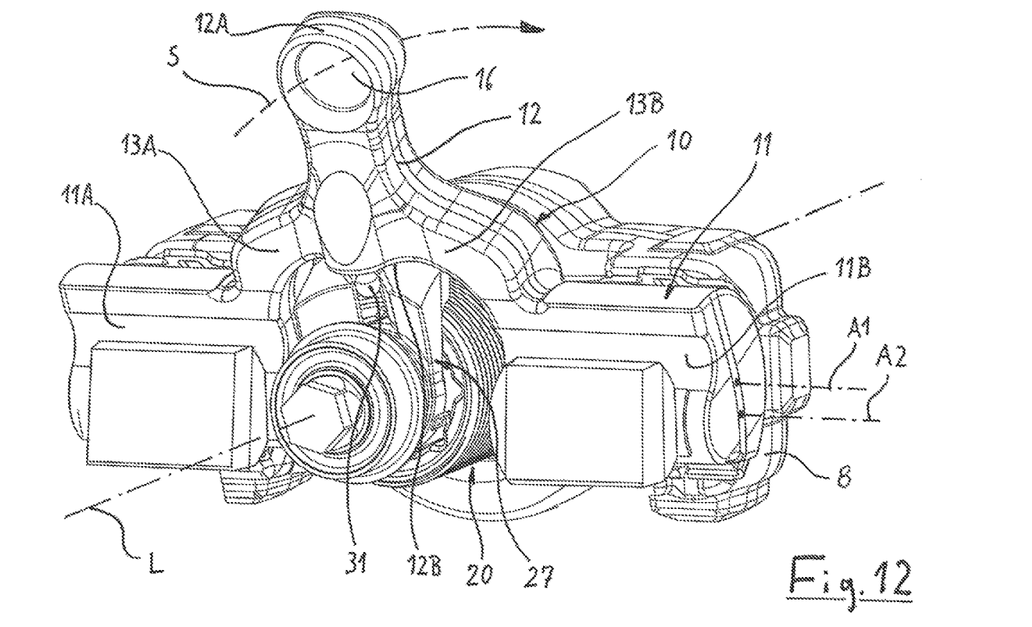
FIG. 12 shows a perspective illustration of a fourth embodiment of a brake application device which is a constituent part of a vehicle disk brake.
Figure 13:
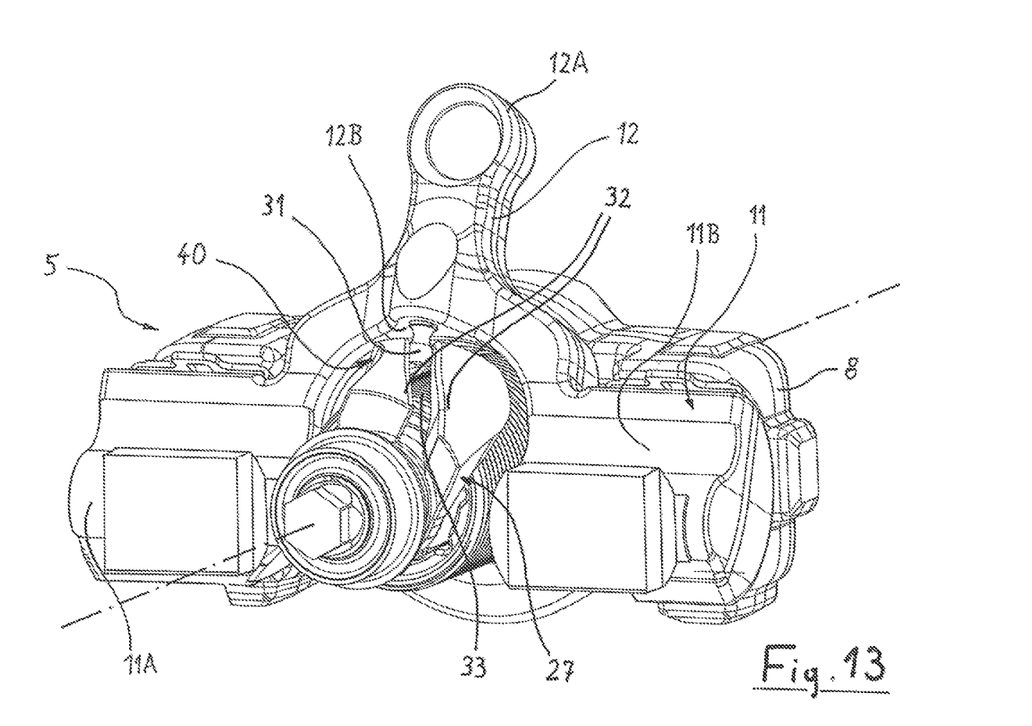
FIG. 13 shows the objects according to FIG. 12, the lever being illustrated in a changed position during a progressing brake application.
Figure 14:
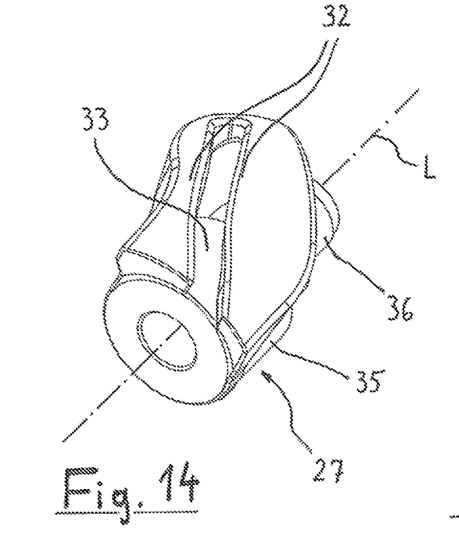
FIG. 14 shows a perspective illustration only of the drive element of the adjusting device.
Figure 15:
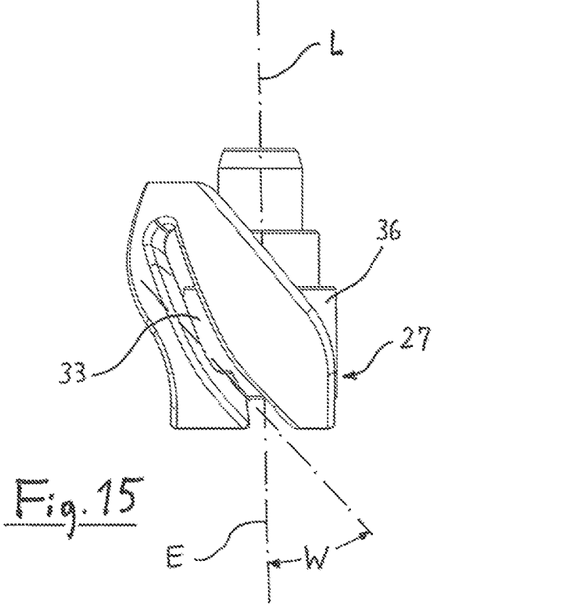
FIG. 15 shows the drive element according to FIG. 14 in a plan view.

FIGS. 9 to 11 show a third embodiment. In said embodiment, there are two pins 31 as first mechanism elements. They are once again situated on the lever arm 12 of the brake lever 10, where the two limbs 13A, 13B branch. During the pivoting of the brake lever 10, the two pins 31 carry out a movement in the plane E which is defined by the pivoting movement S of the lever arm 12, during which movement they slide along the two sides of the second mechanism element 32 which is designed here as a single slotted guide arm. As a result, the second mechanism element 32 experiences a rotation about the adjusting axis L.

FIGS. 12-17 show further embodiments which differ from the embodiments described up to now by way of a different course of the slotted guide 32 which is configured on the drive element 27. This is because, in said embodiments, the slotted guide 32 runs over its entire length obliquely with respect to the plane E which is defined by the pivoting movement S of the lever arm 12. In addition, the angle W, at which the slotted guide 32 and its slot 33, into which the lever-side drive element 31 engages, extend obliquely with respect to the plane E, is not identical over the length of the slotted guide 32, but rather the angle W changes. The angle W with respect to the plane E is greater at the beginning of the pivoting movement S, and then becomes smaller in the course of the brake application, that is to say with an increasing pivoting movement S of the lever 10.

In said embodiment, there is therefore no quasi passive slotted guide section. Rather, the transmission of movement starts immediately and directly. This function is appropriate when the components of the adjusting device 20 which follow with regard to the transmission of movement operate with a certain mutual play, in particular the components which are combined in the adjusting device. In this case, the play which is absolutely necessary for a mechanical brake adjustment is therefore not achieved by way of the course of the slotted guide, but rather by way of the existing system play in the individual components of the adjusting device 20.

In the embodiments according to FIGS. 12-17, the drive element 27 of the adjusting device 20 also consists of plastic. It is composed in one piece of the slotted guide 32, which is designed as a double arm with a slot guide 33, and the carrier 35, on which the double arm is integrally formed. The carrier 35 has a fastening region 36 for mounting the drive element 27 fixedly so as to rotate with it. Here, the fastening region 36 is designed in part as a bush which has external diameters which taper in a stepped manner over its length.

Figure 16:
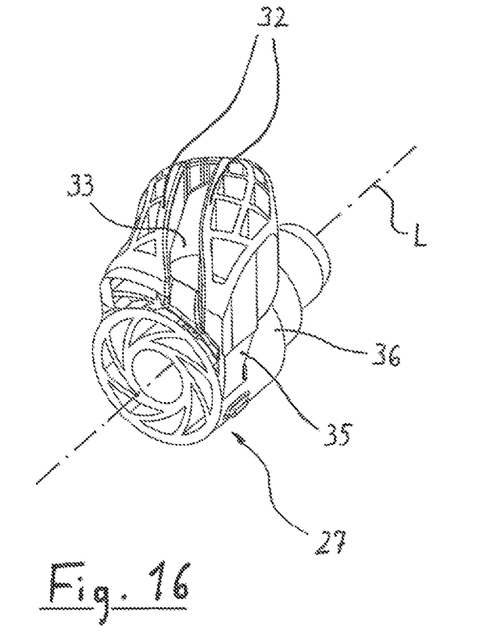
FIG. 16 shows a perspective illustration of an embodiment of the drive element which is varied in comparison with FIG. 14.
Figure 17:
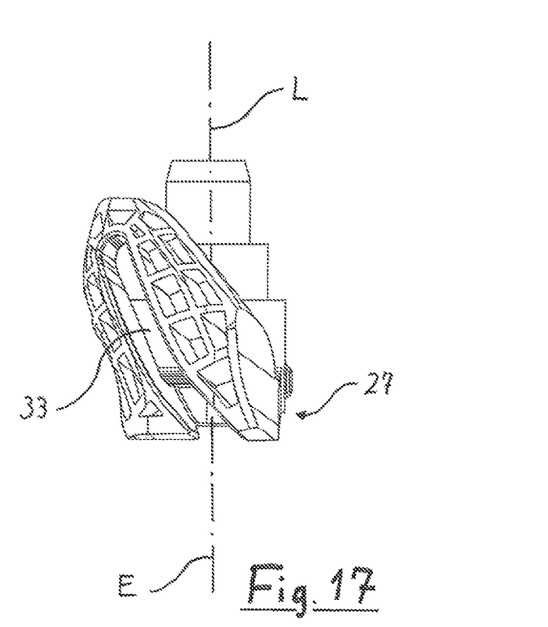
FIG. 17 shows the drive element according to FIG. 16 in a plan view.

In accordance with the variant of FIG. 16 and FIG. 17, the drive element 27 including the slotted guide 32 can be designed as a plastic honeycomb structure, for reasons of production technology, in order thus to achieve a high strength with a low weight.

LIST OF DESIGNATIONS

5 Brake application device
8 Pressure piece
10 Brake lever
11 Brake application shaft
12 Lever arm
12A Outer end of the lever arm
12B Inner end of the lever arm
13A Limb
13B Limb
16 Support
17 Split bearing
20 Adjusting device
27 Drive element
31 First mechanism element
31A Slotted guide section
31B Slotted guide section
32 Second mechanism element
32A Slotted guide section
32B Slotted guide section
33 Slot, groove
35 Carrier
36 Fastening region
39 Inner edge
40 Clearance
A1 Rotational axis
A2 Rotational axis
E Plane of the pivoting movement
L Adjusting axis
S Pivoting movement of the brake lever
W Angle

The invention claimed is:

1. A disk brake for a vehicle having
a brake caliper which engages over a brake disk and brake linings on both sides of the brake disk,
a brake application device (5) which can be actuated by way of a pneumatic cylinder,
an adjusting device (20) for compensating for the brake lining and brake disk wear, which adjusting device (20) is arranged on an adjusting axis (L) which extends in the brake application direction, and is provided with a drive element (27) which can be rotated about the adjusting axis (L), and
a brake lever (10) which is a constituent part of the brake application device (5) and is composed of a brake application shaft (11) which is mounted in the brake caliper on a pivoting axis and is supported such that it the brake application shaft (11) can be moved rotationally against a pressure piece (8) which operates against the brake application-side brake lining, and a lever arm (12) which is connected to the brake application shaft (11) and a pivoting center line of which extends at a right angle with respect to the brake application shaft (11), and which lever arm (12) is provided with a support (16) for the force element in the region of its outer end (12A), the brake lever (10) having a clearance (40) in an extension of the lever arm (12) to the inside, through which clearance (40) the adjusting axis (L) extends,
a mechanism which couples the brake lever (10) to the drive element (27), and which is composed of a first mechanism element (31) on the brake lever (10) and a second mechanism element (32) on the drive element (27), which second mechanism element (32) interacts with said first mechanism element (31), characterized in that the first mechanism element (31) is arranged at the inner end (12B) of the lever arm (12) in a plane (E) which is defined by a pivoting movement (S) of the lever arm (12), and in that one of the two mechanism elements is a slotted guide (31, 32) and the other mechanism element is an element which is guided along the slotted guide (31, 32).

2. The disk brake as claimed in claim 1, characterized in that the first mechanism element (31) is a single or double pin which is fastened in the brake lever (10).

3. The disk brake as claimed in claim 1, characterized in that the brake lever (10) is a forged component or a cast component, and in that the first mechanism element (31) is forged or cast onto the brake lever (10).

4. The disk brake as claimed in claim 1, characterized in that the slotted guide (31, 32) extends at least over part of its length obliquely with respect to the plane (E) which is defined by the pivoting movement (S) of the lever arm (12).

5. The disk brake as claimed in claim 4, characterized in that the slotted guide (31, 32) extends over its entire length obliquely with respect to the plane (E) which is defined by the pivoting movement (S) of the lever arm (12).

6. The disk brake as claimed in claim 4, characterized in that an angle (W), at which the slotted guide (31, 32) extends obliquely with respect to the plane (E) which is defined by the pivoting movement (S) of the lever arm (12), varies over the length of the slotted guide (31, 32).

7. The disk brake as claimed in claim 6, characterized in that the angle (W) becomes smaller as the pivoting movement (S) increases during the brake application.

8. The disk brake as claimed in claim 1, characterized in that the slotted guide (31, 32) describes an arc which is curved outward in relation to the adjusting axis (L) and the curved course of which corresponds at least over a part length to the path which is taken by the inner end (12B) of the lever arm (12) during its pivoting movement (S).

9. The disk brake as claimed in claim 1, characterized in that the drive element (27) is composed of the slotted guide (32), which is designed as a single or double arm, and a carrier (35), to which the slotted guide (32) is fastened, and in that the carrier (35) has a fastening region (36) for mounting the drive element (27) on the adjusting device fixedly so as to rotate with the carrier (35).

10. The disk brake as claimed in claim 9, characterized in that the slotted guide (32) and the carrier (35) consist of plastic.

11. The disk brake as claimed in claim 1, characterized in that the first mechanism element (31) is arranged where the brake lever branches in a fork-shaped manner into a first limb (13A) which leads to a first section (11A) and a second limb (13B) which leads to a second section (11B) of the brake application shaft (11).

12. A drive element (27) of an adjusting device for a disk brake for which an adjusting device compensates for wear of a brake lining and a brake disk of the disk brake, the drive element (27) having
   a carrier (35), on which a fastening region (36) is configured for mounting the drive element (27) on the adjusting device fixedly so as to rotate with the carrier (35), and
   a slotted guide (32) which is arranged on the carrier (35) in the shape of a double arm and describes an arc which is curved outward in relation to the fastening region (36) of the carrier (35),
characterized in that the slotted guide (32) extends at least over part of its length obliquely with respect to a longitudinal axis of the adjusting device.

13. The drive element as claimed in claim 12, characterized in that the slotted guide (31, 32) extends over its entire length obliquely with respect to the longitudinal axis of the adjusting device.

14. The drive element as claimed in claim 12, characterized in that an angle (W), at which the slotted guide (32) extends obliquely with respect to the longitudinal axis of the adjusting device, varies over the length of the slotted guide (32).

15. The drive element as claimed in claim 12, characterized in that the slotted guide (32) and the carrier (35) consist of plastic.

* * * * *